United States Patent
Debras et al.

(10) Patent No.: US 6,214,947 B1
(45) Date of Patent: Apr. 10, 2001

(54) PRODUCTION OF POLYETHYLENE FOR BLOW MOULDING

(75) Inventors: Guy Debras, Frasnes-lez-Gosselies; Bodart Philippe, Clermont-sous-Huy, both of (BE)

(73) Assignee: Fina Research, S.A., Feluy (BE)

( * ) Notice: Subject to any disclaimer, the term of this patent is extended or adjusted under 35 U.S.C. 154(b) by 0 days.

(21) Appl. No.: 09/092,656

(22) Filed: Jun. 5, 1998

(30) Foreign Application Priority Data

Jun. 6, 1997 (EP) .................................................. 97109217
Sep. 27, 1997 (EP) .................................................. 97202972

(51) Int. Cl.[7] .............................. C08F 4/69; C08F 10/02
(52) U.S. Cl. ........................... 526/96; 526/106; 526/113; 526/154; 502/171; 502/309
(58) Field of Search .................... 502/309, 171; 526/96, 113, 154, 106

(56) References Cited

U.S. PATENT DOCUMENTS 4,224,428 * 9/1980 Kirch et al. .......................... 526/106
5,096,868 * 3/1992 Hsieh et al. .......................... 502/107

* cited by examiner

*Primary Examiner*—Fred Teskin
(74) *Attorney, Agent, or Firm*—Jim Wheelington

(57) ABSTRACT

A process for preparing a supported chromium-based catalyst for the production of high density polyethylene, by polymerising ethylene, or copolymerising ethylene and an alpha-olefinic comonomer comprising 3 to 10 carbon atoms, which comprises the steps of: a) providing an alumina-containing support; b) depositing a chromium compound on the support to form a chromium-based catalyst; c) dehydrating the chromium-based catalyst to remove physically adsorbed water by heating the catalyst at a temperature of at least 300° C. in an atmosphere of dry, inert gas; d) titanating the chromium-based catalyst at a temperature of at least 300° C. in an atmosphere of dry, inert gas containing a titanium compound of the general formula selected from $R_n Ti(OR')_m$ and $(RO)_n Ti(OR')_m$ wherein R and R' are the same or different and are hydrocarbyl groups containing from 1 to 12 carbon atoms, n is 0 to 3, m is 1 to 4 and m+n equals 4, to form a titanated chromium-based catalyst having a titanium content of from 1 to 5% by weight, based on the weight of the titanated catalyst; and e) activating the titanated catalyst at a temperature of from 500 to 900° C.

7 Claims, 2 Drawing Sheets

PRODUCTION OF POLYETHYLENE FOR BLOW MOULDING

Figure 1:
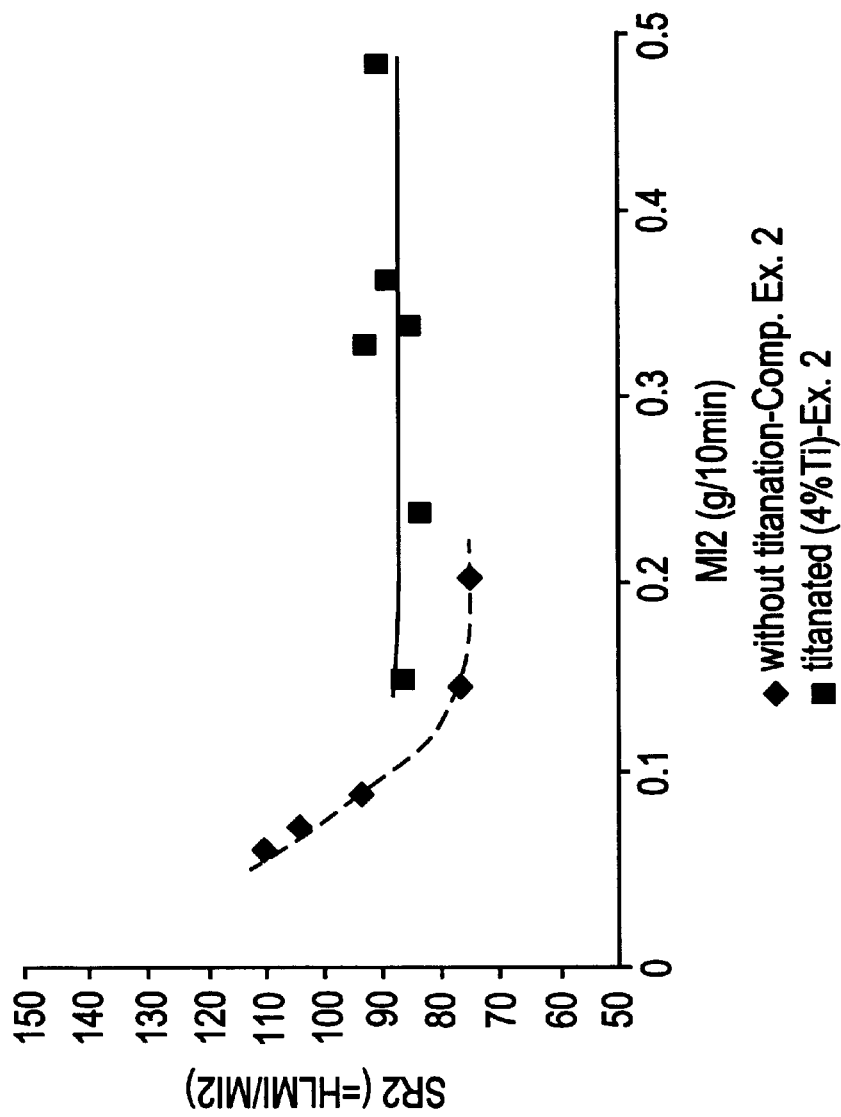

The present invention relates to a process for the production of a chromium-based catalyst for producing polyethylene suitable for blow moulding, a process for producing polyethylene using such a catalyst, and the use of such a catalyst.

Polyethylene is well known for use in the manufacture of blow moulded articles, for example bottles. It is known in the art that polyethylene resin produced for the manufacture of blow moulded articles must achieve a balance of (a) physical properties of the resin so that the resultant blow moulded article has the required physical characteristics and (b) processing properties of the resin so that the polyethylene melt may readily be processed into the blow moulded article. In order to achieve good processability of the polyethylene resins, it is desired that the flow properties and the shear response of the polyethylene are improved by broadening the molecular weight distribution of the polyethylene. Moreover, the physical properties of the solid resin when employed for blow moulding bottles require the resin to have a high density and a high environmental stress cracking resistance (ESCR).

As a general rule, a polyethylene having a higher density tends to have a higher degree of stiffness, thereby making it more suitable for blow moulding into bottles. A higher stiffness in the known polyethylene increases bottle strength and enables thinner walls to be employed. However, in general, the environment stress cracking resistance of polyethylene has an inverse relationship with stiffness. In other words, as the stiffness of polyethylene is increased, the environment stress cracking resistance decreases, and vice versa. This inverse relationship is known in the art as the ESCR-rigidity balance. It is required, for any given bottle grade polyethylene, to achieve a compromise between the environmental stress cracking resistance of the polyethylene and the rigidity of the polyethylene employed in the blown bottle.

A number of different catalyst systems have been disclosed for the manufacture of polyethylene, in particular high density polyethylene (HDPE) suitable for blow moulding. It is known in the art that the physical properties, in particular the mechanical properties, of a polyethylene product vary depending on what catalytic system was employed to make the polyethylene. This is because different catalyst systems tend to yield different molecular weight distributions in the polyethylene produced. It is known to employ a chromium-based catalyst (i.e. a catalyst known in the art as a "Phillips catalyst)". Such a chromium-based catalyst enables the production of polyethylene having desirable physical and Theological properties.

It is known in the art to use chromium-based catalysts to polymerise HDPE and in particular to product high density polyethylene having high resistance to environmental stress cracking. For example, EP-A-0291824, EP-A-0591968 and U.S. Pat. No. 5,310,834 each disclose mixed catalyst compositions, incorporating chromium-based catalysts, for the polymerisation of polyethylene. Each of those prior proposals suffers from the disadvantage that mixed catalysts are required which can increase the complexity and cost of the process.

It is known in the art to provide titanium in a chromium-based catalyst. Titanium can be incorporated either into the support for the chromium catalyst or into the catalytic composition deposited on the support.

Titanium can be incorporated into the support by coprecipitation or terprecipitation as is the case for cogel and tergel type catalysts developed by Phillips Petroleum. Cogel and tergel catalysts respectively have binary and ternary supports.

Alternatively, titanium can be incorporated into the support by impregnation of the support as described for example in U.S. Pat. No. 4,402,864 or by chemisorption of a titanium compound into the support as described for example in U.S. Pat. No. 4,016,343.

Titanation of the catalytic composition has been disclosed in earlier patent specifications.

U.S. Pat. No. 5,006,506 discloses a titanated chromium-based catalyst having a silica or silica/alumina support by drying the catalyst and then treating the dried catalyst with tetraisopropyltitanate prior to activation of the catalyst.

U.S. Pat. No. 4,718,703 discloses that titanium can be incorporated into the catalytic composition by adding to a composite liquid suspension, of a carrier material (i.e. a support) and chromium trioxide, a titanium compound of the formula $Ti(OR)_4$.

U.S. Pat. No. 4,224,428 discloses the titanation of a chromium-based catalyst having a silica support by treating the catalyst, after a drying step, with liquid tetraisopropoxide, followed by activation.

U.S. Pat. No. 4,184,979 discloses that titanium can be incorporated into the catalytic composition by adding at elevated temperature a titanium compound such as titanium tetraisopropoxide to a chromium-based catalyst which has been heated in a dry inert gas The titanated catalyst is then activated at elevated temperature.

U.S. Pat. No. 3,798,202 discloses the production of a titanated chromium-based catalyst for the production of low density polyethylene.

It is an aim of the present invention to provide a process for producing polyethylene suitable for blow moulding which employs a single chromium-based catalyst.

It is a further aim of the present invention to provide such a process for producing blow moulding grade polyethylene having a good balance of rheological and mechanical properties.

It is a yet further aim of the present invention to provide a process for producing blow moulding grade polyethylene having a good balance between the environmental stress cracking resistance and rigidity.

Accordingly, the present invention provides a process for preparing a supported chromium-based-catalyst for the production of high density polyethylene, by polymerising ethylene, or copolymerising ethylene and an alpha-olefinic comonomer comprising 3 to 10 carbon atoms, which comprises the steps of: a) providing an alumina-containing support; b) depositing a chromium compound on the support to form a chromium-based catalyst; c) dehydrating the chromium-based catalyst to remove physically adsorbed water by heating the catalyst at a temperature of at least 300° C. in an atmosphere of dry, inert gas; d) titanating the chromium-based catalyst at a temperature of at least 300° C.

in an atmosphere of dry, inert gas containing a titanium compound of the general formula selected from $R_nTi(OR')_m$ and $(RO)_nTi(OR')_m$ wherein R and R' are the same or different and are hydrocarbyl groups containing from 1 to 12 carbon atoms, n is 0 to 3, m is 1 to 4 and m+n equals 4, to form a titanated chromium-based catalyst having a titanium content of from 1 to 5% by weight, based on the weight of the titanated catalyst; and e) activating the titanated catalyst at a temperature of from 500 to 900° C.

The present invention further provides a process for producing high density polyethylene suitable for blow moulding by polymerisation of ethylene or copolymerisation of ethylene with an alpha-olefinic comonomer comprising from 3 to 10 carbon atoms in the present of a catalyst produced in accordance with the invention.

The present invention also provides the use, for improving the environmental stress crack resistance of polyethylene resins, of a catalyst produced in accordance with the invention in a process for producing high density polyethylene suitable for blow moulding, the process comprising polymerising ethylene, or copolymerising ethylene and an alpha-olefinic comonomer comprising from 3 to 10 carbon atoms.

The present invention is predicated on the surprising discovery by the present inventor that the use of the combination of particular treatment steps for producing a particular catalyst system comprising a chromium-based catalyst, having an alumina-containing support, and a titanated surface, can produce a blow moulding grade polyethylene exhibiting improved mechanical properties, in particular an improved ESCR-rigidity balance, than other chromium-based catalysts.

The high density polyethylene preferably has a Bell ESCR F50 value of over 100 hours.

The improved processing performance results from broadening the molecular weight distribution and thus increasing the shear response, while maintaining the same good ESCR-rigidity balance.

The preferred chromium-based catalyst comprises chromium oxide on a silica-alumina support. The support preferably comprises from 0.75 to 6 wt % aluminium, more preferably from 2 to 4 wt % aluminium, most preferably around 2 wt % aluminium, based on the weight of the chromium-containing catalyst. The catalyst preferably comprises at least 0.5 wt % chromium, more preferably from 0.5 to 5 wt % chromium, most preferably around 1 wt %, based on the weight of the chromium-containing catalyst The catalyst may have a specific surface area of from 200 to 700 $m^2/g$, preferably from 275 to 500 $m^2/g$, most preferably around 350 $m^2/g$ and a volume porosity of greater than 1 cc/g preferably from around 1.5 to 3 cc/g, most preferably around 2.5 to 2.7 cc/g. Particularly preferred catalysts have a pore volume of at least 2.5 cc/g and a specific surface area of at least 275 $m^2/g$.

A particularly preferred chromium-based catalyst ("catalyst 1") for use in the present invention has the following properties: a support of $SiO_2$ and $Al_2O_3$ having around 2.1 wt % Al, a pore volume of 2.7 cc/g and a specific surface area of 360 $m^2/g$. An alternative preferred chromium-based catalyst ("catalyst 2") for use in the invention has the following properties: a support of $SiO_2$ and $Al_2O_3$ having around 0.76 wt % $Al_2$, a chromium content of around 0.5 wt %, a pore volume of 2.5 cc/g and a specific surface area of 388 $m^2/g$.

The chromium-based catalyst is subjected to a pretreatment in order to dehydrate it by driving off physically adsorbed water from the silica-alumina support i.e. chemically adsorbed water in the form of hydroxide (—OH) groups bonded to the —Si—O—framework of the support need not be removed. The removal of physically adsorbed water avoids the formation of $TiO_2$ as a product from the reaction of water with the titanium compound subsequently introduced during he titanation procedure, as described below. The dehydration step is preferably carried out by heating the catalyst to a temperature of at least 300° C. in a fluidised bed and in a dry inert atmosphere of, for example, nitrogen. The dehydration step is preferably carried out for 0.5 to 2 hours.

The dehydrated catalyst is then subjected to a titanation step at elevated temperature preferably in the fluidised bed, also in an inert atmosphere, in which a titanium-containing compound decomposes at the elevated temperature to deposit titanium onto the surface of the catalyst. The titanium compound may be of the formula $R_nTi(OR')_m$ or $(RO)_nTi(OR')_m$ where R and R' are the same or different and can be any hydrocarbyl group containing 1 to 12 carbon atoms, n is 0 to 3, m is 1 to 4 and m+n equals 4. Preferably, the titanium compound is a titanium tetraalkoxide $Ti(OR')_4$ where R' can be an alkyl or a cycloalkyl group each having from 3 to 5 carbon atoms. The titanation is performed by progressively introducing the titanium compound into the stream of dry, inert non-oxidising gas described hereabove in the dehydration step, maintained at at least 300° C. Preferably, the titanium compound is pumped as a liquid into the reaction zone where it is vapourised. This titanation step is controlled so that the titanium content of the resultant catalyst is preferably from 1 to 5% by weight, and preferably from 2 to 4% by weight, based on the weight of the titanated chromium-based catalyst. The total amount of titanium compound introduced into the gas stream is calculated in order to obtain the required titanium content in the resultant catalyst and the progressive flow rate of the titanium is adjusted in order to provide a titanation reaction period of 0.5 to 1 hour.

After the introduction of the titanium compound has been terminated at the end of the reaction period, the catalyst is flushed under the gas stream for a period of typically 0.75 hours.

The dehydration and titanation steps are performed in the vapour-phase in a fluidised bed.

With out being bound by theory, it is believed that the titanium is chemically bonded to the —Si—O— framework of the support.

The chromium-based catalyst is preferably activated at an elevated temperature, preferably at a temperature from 500 to 900° C., more preferably from 550 to 750° C., most preferably around 650° C.

In the preferred process of the present invention, the polymerisation or copolymerisation process is carried out in the liquid phase in which ethylene, and for copolymerisation an alpha-olefic comonomer comprising from 3 to 10 carbon atoms, are present in an inert diluent. The comonomer may be selected from 1-butene, 1-pentene, 1-hexene, 4-methyl 1-pentene, 1-heptene and 1-octene. The inert diluent is preferably isobutane. The polymerisation or copolymerisation process is typically carried out at a temperature of from 85 to 110° C., most preferably from 95 to 105° C. The polymerisation or copolymerisation process is preferably carried out at a pressure of from 20 to 45 bar, most preferably from 40 to 42 bar. Typically, in the polymerisation process the ethylene, monomer comprises from 0.5 to 8% by weight, typically around 6% by weight of the total weight of the ethylene in the inert diluent. Typically, in the copolymerisation process ethylene comonomer comprises 0.5 to 6% by weight and the comonomer comprises from 0.5 to 3% by weight, based on the total weight of the ethylene monomer and comonomer in the inert diluent.

In the process of the present invention, the titanated and activated chromium-based catalyst is introduced into the polymerisation reactor. Alkylene monomer and where appropriate comonomer are fed into the polymerisation reactor in the inert diluent and hydrogen gas is also introduced into the polymerisation reactor. The polymerisation product of high density polyethylene is discharged from the reactor and separated from the diluent which can then be recycled.

The polyethylene resins produced in accordance with the process of the invention have physical properties making them particularly suitable for use as blow moulding grade polyethylenes. In particular, the process of the present invention can produce polyethylene resins in pellet form having a high load melt index (HMLI) ranging from 10 to 60 g/10', preferably from 15 to 35 g/10', and a melt index ($MI_2$) ranging from 0.02 to 0.5 g/10'. Both the high load melt index HMLI and the melt index $MI_2$ were determined during the procedures of ASTM D 1238 using respective loads of 21.6 kg and 2.16 kg at a temperature of 190° C. Moreover, the shear response, which is a ratio between the HLMI and $MI_2$ values and is representative of the processability of the polyethylene resins produced in accordance with the process of the invention, can vary, from 80 to 200.

The process of the present invention also can produce polyethylene resins having a good compromise between the ESCR and rigidity. The Bell ESCR (50° C. 100% antarox) was measured in accordance with ASTM D-1693-70, Procedure B.

Figure 2:
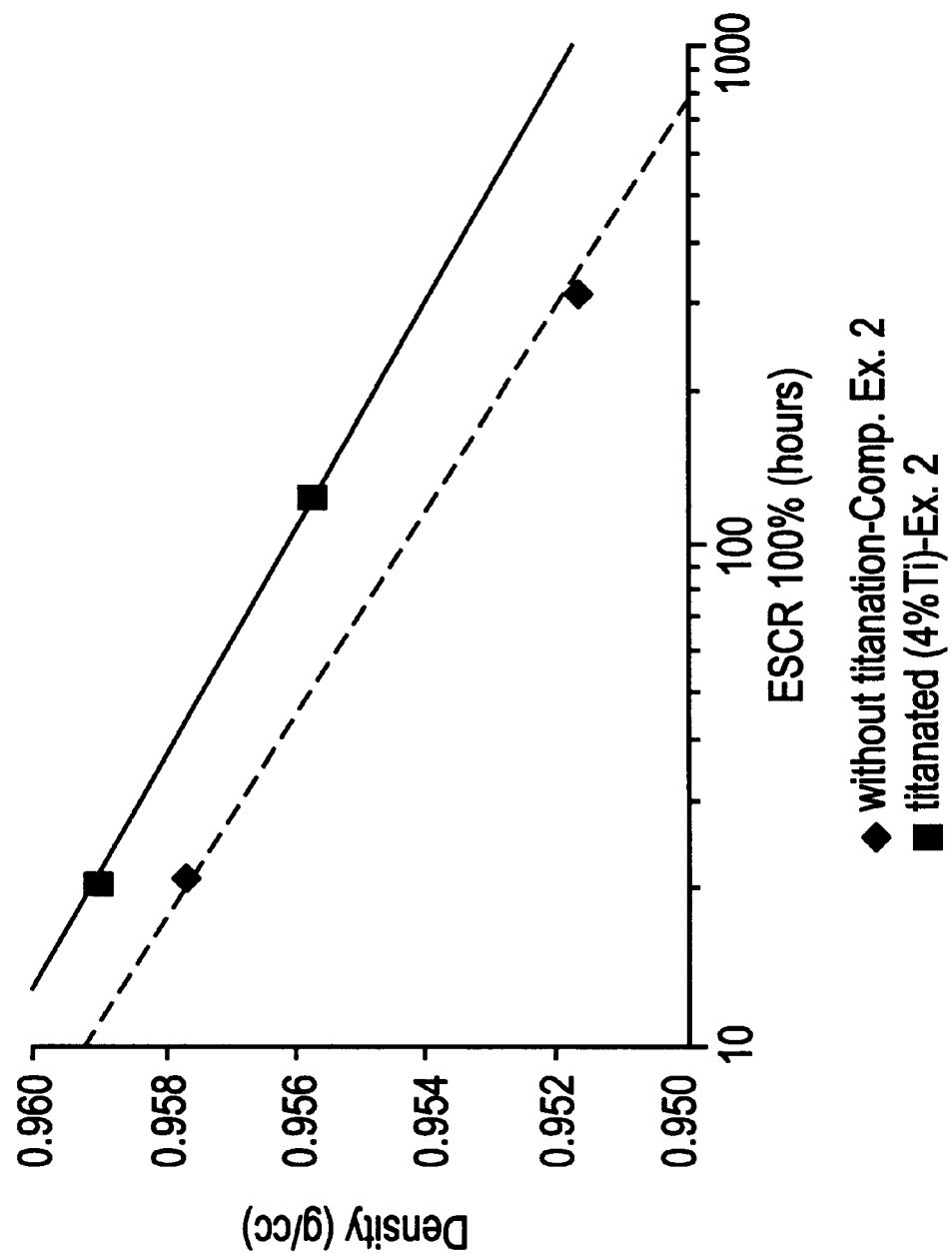

The present invention will now be described with reference to the following non-limiting Examples and with reference to the accompanying drawings, in which:

FIG. 1 is a graph illustrating a relationship between the shear response and the melt index of polyethylene resins fabricated in accordance with Example 2 and Comparative Example 2; and FIG. 2 is a graph illustrating a relationship between the density and the ESCR of polyethylene resins fabricated in accordance with Example 2 and Comparative Example 2.

In order to demonstrate the preferred processes of the present invention in which a chromium-based catalyst was employed to polymerise polyethylene a number of runs to homopolymerise and copolymerise ethylene to form high density polyethylene were performed as Examples 1 to 3.

EXAMPLE 1

In this Example, a liquid comprising ethylene, 1-hexene and the balance isobutane as an inert diluent was fed into a polymerisation reaction zone at a pressure of around 40 bars and at a polymerisation temperature of around 102° C. Hydrogen was also fed into the polymerisation reaction zone. In Example 1, the catalyst system comprised the chromium-based catalyst "catalyst 1" which had been subjected to a pretreatment comprising dehydration, titanation and activation.

The dehydration, titanation and activation steps were carried out as follows. The chromium-based catalyst was introduced into an activator vessel incorporating a fluidised bed, flushed under nitrogen and the temperature was raised from room temperature to 300°C. The dehydration step was then carried out at this elevated temperature for 2 hours. After the dehydration step, titanium tetraisopropoxide, stored under anhydrous nitrogen, was progressively injected into the bottom of the activator vessel incorporating the fluidised bed. The amount of titanium tetraisopropoxide injected was calculated in order to give the require titanium content in the resultant catalyst and the flow thereof was adjusted in order to continue the injection to complete the desired level of titanation in around 30 minutes. After the injection was completed, the catalyst was flushed under nitrogen for around 45 minutes. Nitrogen was then progressively switched to air and the temperature was raised to the activation temperature of around 650° C. for the subsequent activation step 1. In the activation step, the titanated chromium-based catalyst was maintained at the activation temperature for 6 hours. At the end of the activation step, the temperature was progressively decreased to 350° C. At continued cooling from 350° C. to room temperature, the catalyst was flushed under nitrogen.

The polymerisation conditions and the properties of the resultant polyethylene products are summarised in Table 1.

COMPARATIVE EXAMPLE 1

Comparative Example 1 was performed with the same catalyst "catalyst 1" but without any dehydration and subsequent titanation of the catalyst. Instead, an alkyl boron, in particular triethylboron (TEB), was added to the catalyst. The TEB was introduced into the polymerisation reactor in the inert diluent and comprised 0.6 ppm based on the weight of the inert diluent. The TEB was employed for the purpose of increasing the activity of the catalyst thereby to increase processing yields. It will be seen that Comparative Example 1 yielded polyethylene pellets having a Bell ESCR (50° 100% antarox) of 78 hours but with a similar HMLI and density as for Example 1.

A comparison between the Bell ESCR values of Example 1 and Comparative Example 1 clearly demonstrates that the use of an alumina-containing support in combination with a titanated surface instead of organoboron compound can provide good environmental stress crack resistance to a polyethylene resin.

Without being bound by theory it is believed that for a chromium-based catalyst having a silica-containing support, the provision of alumina in the support provides a high molecular weight fraction for the polyethylene resin. The dehydration and titanation of the catalyst to give a titanated surface in turn provides a good low molecular weight fraction yielding for the polyethylene resin as a whole a broad molecular weight distribution. This in turn provides the polyethylene resin with the property of good environmental stress crack resistance. In contrast to Comparative Example 1 which employed TEB to produce a low molecular weight fraction, it may be seen that for Comparative Example 1 and Example 1 the HLMI and density of the polyethylene resins produced therefrom have substantially the same values, the use of titanation in the catalyst of the invention gave unexpectedly improved environment stress crack resistance as compared to the use of substantially the same catalyst but with addition of TEB instead of a pretreatment involving dehydration and titanation in accordance with the invention.

EXAMPLE 2

In this Example, a Cr/SiAl-oxide catalyst was prepared by treating a silica carrier available in commerce from the company Grace GmbH of Worms, Germany and sold under the trade name Grace G5H, with the reaction product of chromium (III) acetylacetonate with triisobutyl aluminium (TIBAL) in hexane, with subsequent drying and stabilisation with air at low temperature. The final catalyst composition comprised 1 wt % Cr and 2 wt % Al, both based on the weight of the catalyst. The catalyst was then activated and titanated by the following procedure. The catalyst was heated from room temperature to 300° C. under nitrogen during which the catalyst was dried. The catalyst was kept at 300° C. while injecting a gaseous mixture of nitrogen and titanium triisopropoxide. The catalyst was then heated from 300 to 650° C. in air and maintained at 650° C. for 6 hours. Thereafter the catalyst was cooled down first under air and then under nitrogen. The final titanium content was 4 wt % Ti based on the weight of the catalyst.

The activated catalyst was then tested for ethylene polymerisation in an autoclave reactor having a volume of 4 liters. The polymerisation occurred in a diluent comprising 2 liters of isobutane. The overall pressure in the autoclave reactor was established so as to employ 6 wt % ethylene dissolved in the isobutane. The polymerisation temperature ranged from 98 to 106° C. over a number of runs and also some runs produced polyethylene by homopolymerisation and other runs produced ethylene by copolymerisation in which 0.5 wt % 1-hexene in the isobutane was introduced into the autoclave reactor. The catalyst activity was established to be about 1000 gPE/g catalyst. The polymerisation temperature enabled the final melt index $MI_2$ to range from about 0.15 to about 0.25 g/10 min. The properties of the polymers made in accordance with this Example are shown in Table 2. As for Example 1, the ESCR of one of the homopolymers and one of the copolymers were measured and the results are shown in Table 2.

COMPARATIVE EXAMPLE 2

In this Comparative Example, Example 2 was essentially repeated except that during the activation of the catalyst, no titanation step was included. In other words, the activation of the catalyst comprised heating the catalyst from room temperature to 300° C. in nitrogen, then heating the catalyst from 300 to 650° C. in air and thereafter maintaining the catalyst at 650° C. for 6 hours. Then the catalyst was cooled down first under air and then under nitrogen. The catalyst was employed to produce polyethylene homopolymers and copolymers in the manner described hereinabove with reference to Example 2. The properties of the resultant polymers are also shown in Table 2.

It may be seen from Table 2 that the use of titanation of the catalyst in Example 2 resulted in an increase of the melt index potential of the catalyst. It may be seen that for any given polymerisation temperature and for both the homopolymers and the copolymers, when the titanated catalyst of Example 2 was employed the $MI_2$ value tended to be higher than obtainable by the untitanated catalyst. Even though higher melt indexes were obtained, the shear response ($SR_2$) was larger for resins obtained employing the titanated catalyst in accordance with Example 2. This should result in better processability of the polyethylene resins. The relationship between the shear response $SR_2$ and the melt index $MI_2$ for the various runs of Example 2 and Comparative Example 2 is illustrated in FIG. 1. It may be seen that using a titanated catalyst in accordance with the invention, not only are higher melt indexes achievable but also for any given melt index the shear response tends to be higher.

In addition, the ESCR/density compromise is enhanced using the titanated catalyst of Example 2 as compared to the untitanated catalyst of Comparative Example 2. This enhancement is illustrated in FIG. 2 which shows the relationship between the density and the ESCR values for catalysts of Example 2 and catalysts of Comparative Example 2.

EXAMPLE 3

In this Example, another CR/SiAl-oxide catalyst was prepared employing a different catalyst synthesis route. In this Example, the dried silica carrier Grace G5H also employed in Example 2 was reacted with TIBAL in a hexane solution, dried, and stabilised with air. The yellow carrier so obtained was then impregnated with chromium (III) acetylacetonate (Cr(acac)$_3$) in a solution of acetone, dried in a rotavapour and finally dried in an oven at 80° C. The final catalyst composition was similar to that of Example 2 except that the catalyst colour was blue instead of green. The catalyst was activated by employing a titanation treatment in the same manner as described hereinabove with reference to Example 2. The target titanium content was 4 wt % titanium based on the weight of the catalyst.

The activated titanated catalyst was tested for ethylene homopolymerisation using the same polymerisation conditions specified in Example 2. The results are shown in Table 3.

COMPARATIVE EXAMPLE 3

In Comparative Example 3, catalysts were prepared in a manner similar to that of Example 3, except that the activation treatment omitted the titanation step. Again, the activated catalyst was tested for ethylene homopolymerisation using the same conditions as for Example 3. The results are shown in Table 3.

It may be seen from Table 3 that use of a titanated catalyst in accordance with the invention provides a marked increase in the melt index of the polyethylene homopolymers as well as an increase in the shear response of those resins.

TABLE 1

|  | EXAMPLE 1 | COMPARATIVE EXAMPLE 1 |
|---|---|---|
| Activation Temp. (° C.) | 650 | 650 |
| Ti Wt % | 3 | 0 |
| COPOLYMERISATION CONDITIONS |  |  |
| Temperature (° C.) | 102 | 103 |
| TEB (ppm) | 0 | 0.6 |
| Ethylene (kg/h) | 9 | 9 |
| 1-hexene (cc/h) | 62 | 51 |
| Hydrogen (Nl/h) | 5 | 18 |
| Isobutane (kg/h) | 26 | 26 |
| PROPERTIES OF POLYETHYLENE PELLETS |  |  |
| HLMI (g/10') | 23.3 | 23.2 |
| MI2 (g/10') | 0.23 | 0.20 |
| Shear Response | 100 | 116 |
| Density (g/cc) | 0.9577 | 0.9572 |
| ESCR F50 Bell 50° C. 100% (h) | 114 | 78 |

TABLE 2

|  | EXAMPLE 2 | | | | | | COMPARATIVE EXAMPLE 2 | | | | |
|---|---|---|---|---|---|---|---|---|---|---|---|
| Polymer Type | Homopolymer | | | Copolymer | | | Homopolmer | | | Copolymer | |
| Run No. | 1 | 2 | 3 | 4 | 5 | 6 | 1 | 2 | 3 | 4 | 5 |
| Polymer Temp (° C.) | 100 | 102 | 104 | 98 | 100 | 102 | 102 | 104 | 106 | 100 | 104 |
| $MI_2$ (g/10 min) | 0.15 | 0.24 | 0.34 | 0.33 | 0.365 | 0.48 | 0.06 | 0.09 | 0.20 | 0.07 | 0.145 |
| HLMI (g/10 min) | 12.7 | 22.0 | 27.5 | 29.5 | 31.3 | 41.8 | 6.5 | 8.2 | 15.1 | 7.4 | 10.9 |
| $SR_2$ (=$HLMI/MI_2$) | 85 | 91 | 82 | 90 | 86 | 88 | 110 | 93 | 74 | 104 | 75 |
| Density (g/cc) | 0.959 | 0.960 | 0.959 | 0.956 | 0.954 | 0.952 | 0.956 | 0.957 | 0.958 | 0.947 | 0.952 |
| ESCR (hours) (100% Antarox 50° C.) | — | 21.3 | — | 127 | — | — | — | — | 21.8 | — | 331 |

TABLE 3

|  | EXAMPLE 3 | | | COMPARATIVE EXAMPLE 3 | |
|---|---|---|---|---|---|
| Polymer Type | Homopolymer | | | Homopolymer | |
| Run No. | 1 | 2 | 3 | 1 | 2 |
| Polymer Temp. (° C.) | 98 | 100 | 102 | 102 | 106 |
| $MI_2$ (g/10 min) | 0.14 | 0.44 | 0.456 | 0.04 | 0.17 |
| HLMI (g/10 min) | 18.7 | 52.4 | 49.1 | 5.5 | 18.4 |
| $SR_2$ (=$HLMI/MI_2$) | 131 | 119 | 106 | 110 | 93 |
| Density (g/cc) | 0.959 | 0.961 | 0.962 | 0.955 | 0.956 |

What is claimed is:

1. A process for preparing a supported chromium-based catalyst for the production of high density polyethylene, by polymerizing ethylene, or copolymerizing ethylene and an alpha-olefinic comonomer comprising 3 to 10 carbon atoms, which comprises the steps of:

(a) providing an alumina-containing support containing from 0.75 to 6 weight percent aluminum in the support based on the weight of the catalyst;

(b) depositing a chromium compound on the support to form a chromium-based catalyst;

(c) dehydrating the chromium-based catalyst to remove physically adsorbed water by heating the catalyst at a temperature of at least 300° C. in an atmosphere of dry, inert gas;

(d) titanating the chromium-based catalyst at a temperature of at least 300° C. in an atmosphere of dry, inert gas containing a titanium compound of the general formula selected from $R_nTi(OR')_m$ and $(RO)_nTi(OR')_m$ wherein R and R' are the same or different and are hydrocarbyl groups containing from 1 to 12 carbon atoms, n is 0 to 3, m is 1 to 4 and m+n equals 4, to form a titanated chromium-based catalyst having a titanium content of from 1 to 5% by weight, based on the weight of the titanated catalyst; and (e) activating the titanated catalyst at a temperature of from 500° to 900° C.

2. A process according to claim 1 wherein the support has a specific surface area of at least 275 m²/g.

3. A process according to claim 1 wherein the titanium compound is a tetraalkoxide of titanium having the general formula $Ti(OR')_m$ wherein R' is selected from an alkyl and a cycloalkyl each having from 3 to 5 carbon atoms.

4. A process according to claim 1 wherein the titanium content of the titanated catalyst is from 2 to 4% by weight, based on the weight of the titanated catalyst.

5. A process according to claim 1 wherein the chromium compound is chromium oxide and the chromium content ranges from 0.5 to 1.5% by weight, based on the weight of the chromium-based catalyst prior to titanation.

6. A process according to claim 1 wherein the catalyst contains from 2 to 4 wt % aluminum, in the alumina-containing support, based on the weight of the catalyst.

7. A process for producing high density polyethylene suitable for blow molding, the process comprising polymerizing ethylene, or copolymerizing ethylene and an alpha-olefinic comonomer comprising from 3 to 10 carbon atoms, in the presence of a chromium-based catalyst produced by:

a) providing an alumina-containing support containing from 0.75 to 6 weight percent aluminum in the support based on the weight of the catalyst.

b) depositing a chromium compound on the support to form a chromium-based catalyst;

c) dehydrating the chromium-based catalyst to remove physically adsorbed water by heating the catalyst at a temperature of at least 300° C. in an atmosphere of dry, inert gas;

d) titanating the chromium-based catalyst at a temperature of at least 300° C. in an atmosphere of dry, inert gas containing a titanium compound of the general formula selected from $R_n Ti(OR')_m$ and $(RO)_n Ti(OR')_m$ wherein R and R' are the same or different and are hydrocarbyl groups containing from 1 to 12 carbon atoms, n is 0 to 3, m is 1 to 4 and m+n equals 4, to form a titanated chromium-based catalyst having a titanium content of from 1 to 5% by weight, based on the weight of the titanated catalyst; and e) activating the titanated catalyst at a temperature of from 500 to 900° C.

* * * * *